Jan. 28, 1969     A. R. CRIPE     3,424,105
ARTICULATED CAR SINGLE AXLE TRUCK

Filed May 11, 1966     Sheet 1 of 2

INVENTOR.
ALAN R. CRIPE
BY Richard M. James.
ATTORNEY

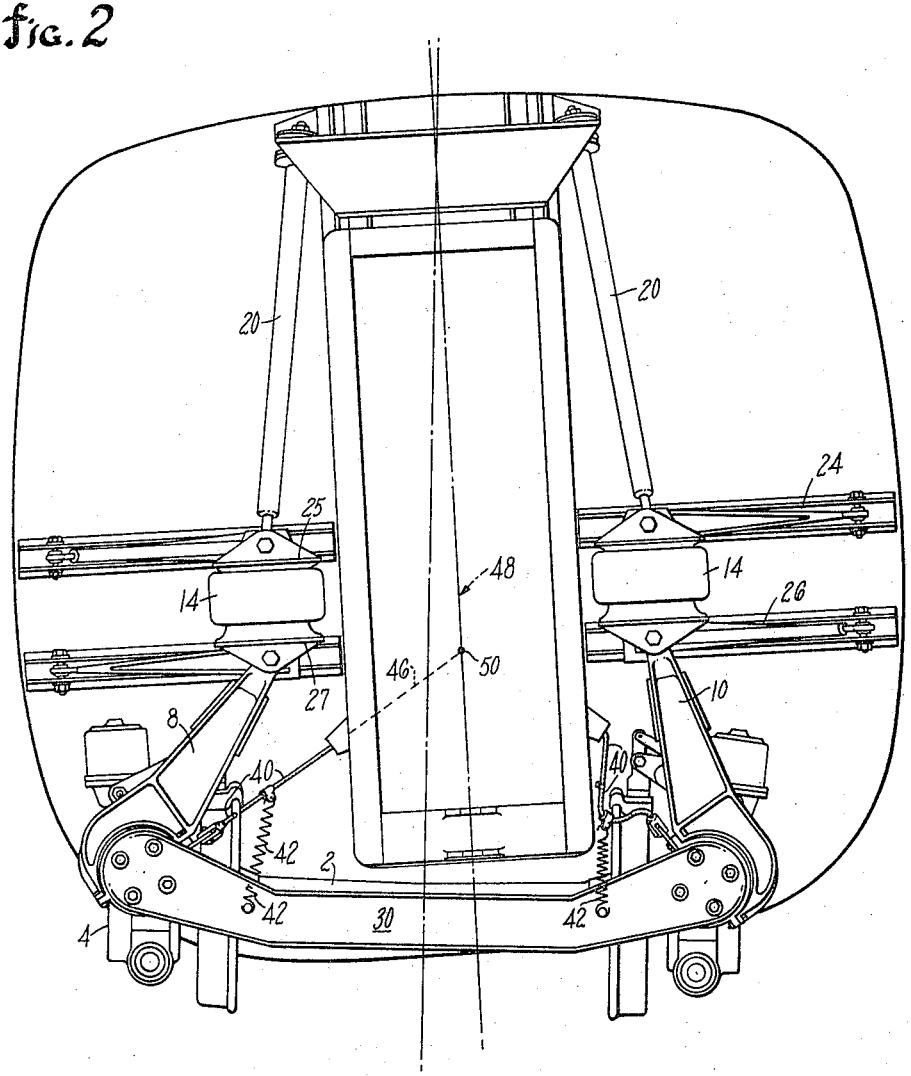

United States Patent Office 3,424,105
Patented Jan. 28, 1969

3,424,105
ARTICULATED CAR SINGLE AXLE TRUCK
Alan R. Cripe, Richmond, Va., assignor to United Aircraft Corporation, East Hartford, Conn., a corporation of Delaware
Filed May 11, 1966, Ser. No. 549,416
U.S. Cl. 105—4                  5 Claims
Int. Cl. B61d 17/20; B61f 5/00, 1/14

ABSTRACT OF THE DISCLOSURE

A suspension system is provided wherein the abutting ends of two railway cars are pendulously supported on pivotal support arms over a single axle. The system incorporates a transversely-extending transom connecting the trunnions about which the support arms rotate, and a cable arresting arrangement of particular geometry.

---

This invention relates in general to railway vehicle suspension systems and more particularly to those systems wherein the abutting ends of two adjacent cars are resiliently supported on a single axle positioned therebetween.

The basic suspension system to which the present invention has reference is best illustrated and described in my prior Patent 2,954,746, issued Oct. 4, 1960. In this suspension system, which is particularly adapted to utilization in lightweight, high performance, articulated passenger trains, the individual cars are caused to bank in curves in a manner similar to aircraft flight. To effect the desired rotation about a longitudinal axis, the cars are pendulously mounted and limited transverse movement is permitted between the bottom of the car and the axle. Accordingly, the bottom of the car will translate outwardly as a result of centrifugal force as a curve is negotiated.

Pneumatic springs suporting the car are mounted on a plurality of support arms which extend upwardly from and are pivotally connected at torsilastic mountings to longitudinally oriented trunnions carried by the respective axle journal boxes. The support arms are normally biased to maintain the car in a centered position but are adapted to rotate in the same direction as the car rounds a curve, developing torsion in the torsilastic mountings which tends to restore the arms to their centered position. As the support arms pivot on the trunnions and the upper ends thereof translate laterally, the support arm on the inside of the curve dips downward and the arm on the outside straightens, providing the desired bank to the car.

In previous constructions the torsion forces developed in the torsilastic mountings during the lateral translation of the support arms were necessarily transmitted through the axle journal boxes and bearings to the axle, and a bending moment was imposed thereon. This bending will be seen to be additive to the other bending forces acting on the axle, including that due to the car weight acting outboard of the wheel and that due to the wheel flange-rail contact on curved track. Further, this bending force is applied to the axle journal box and bearing in the form of a twisting force which tends to rotate the journal box parallel to the axis of the axle, resulting in excessive bearing loading and necessitating increased complexity and weight in the journal box structure.

It is an object of my present invention to relieve the axle and axle bearings from the torque forces resulting from the lateral movement of the cars. For this purpose, a transom is provided between the corresponding trunnions on transversely opposite sides of the suspension, the respective transom-trunnion connections being made to prevent rotation of the trunnions about a longitudinal axis.

While it is necessary to permit freedom of movement between the car body and the axle in a lateral direction to achieve the banking effect desired, and in a vertical direction to permit the operation of the pneumatic spring in its normal operating mode, it is nevertheless essential that these movements never exceed predetermined limits. An excessive movement of the car body in a lateral direction might cause interference between the car and high level platforms or similar structures which are passed close abroad the train in transit. Additionally, an excessive vertical movement may cause damage to or separation of the suspension system from the vehicle as for example, during a derailment.

It is, accordingly, a further object of my invention to provide in a single-axle suspension system combined means for limiting both the downward vertical movement of the axle with respect to the car body and the transverse movement between these members, to respective predetermnied maximums. This object is effected through the use of a flexible member at each side of the system interconnecting the respective axle journal boxes and the respective cars with sufficient slack to permit the vertical and transverse translation of the suspension system in its normal operating mode, the flexible members at full extension, however, limiting the above-described movements to their predetermined maximums.

These and other objects and advantages of my invention will be set forth in the following description or will be evident therefrom or from practice of this invention.

FIG. 2 is an end view of the present invention as attached to the end of a railway car, illustrating particularly, the preferred orientation of the flexible members limiting the transverse and vertical movements between the car and the suspension system, the car being shown in the banked position.

Figure 1:
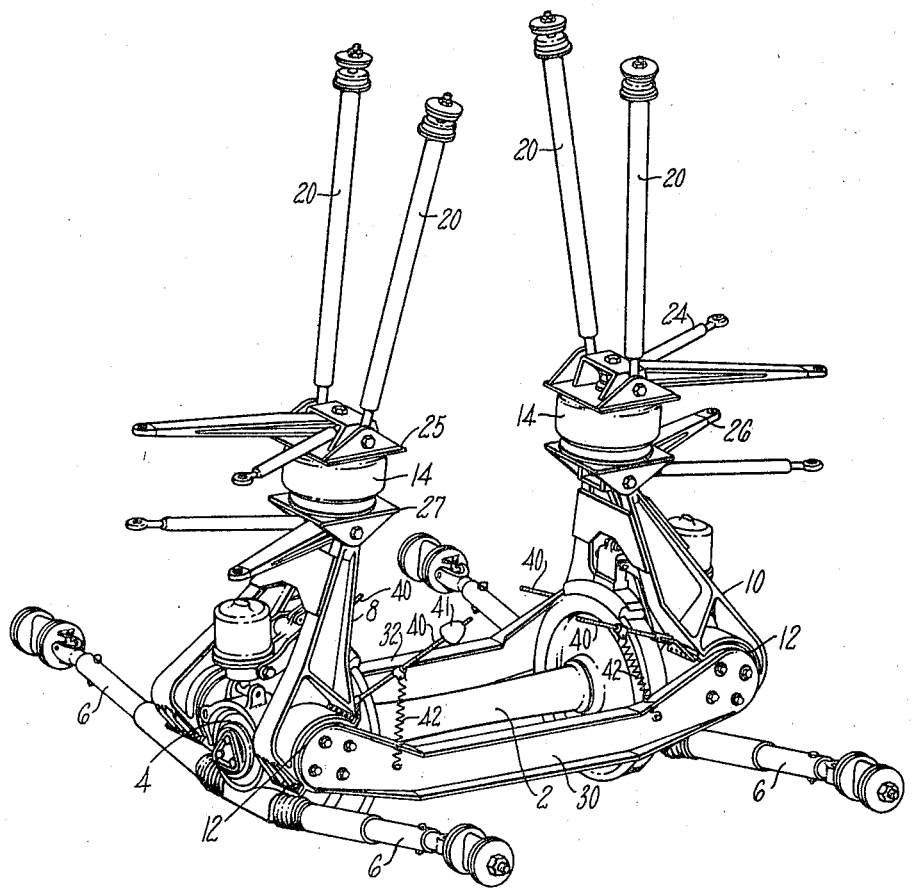
FIG. 1 is a perspective view of the suspension system according to the present invention.
Figure 3:
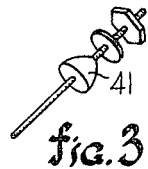
FIG. 3 is a fragmentary view of the end of the arresting cable 40 with resilient bumper positioned thereon.

As may be seen by reference to the drawings, the suspension system described herein is generally symmetrical about its centerline and, as previously indicated, is positioned in the space between the abutting ends of the adjacent cars. A single rotating axle 2 with attached wheels is journalled at each end in journal boxes 4 from which the suspension system is mounted and through which the requisite vertical support for the ends of both cars is provided.

Expandable drag links 6, extending fore and aft from the axle at each side thereof, are utilized to position the axle in the space between the cars and to maintain the axle on the bisector of the angle between the cars, as described in my prior Patent 2,935,031.

The respective axle journal boxes are provided with longitudinally oriented trunnions (not shown) on which support arms 8 and 10 are pivotally positioned in torsilastic mountings 12. The support arms are adapted to pivot about the trunnions in a vertical plane parallel to the centerline of the axle as a transversely-acting centrifugal force is exerted on the cars in a curve. As the arms pivot and the cars translate laterally with respect to the axle, the free end of the support arm on the inside of the curve dips downward while that of the support arm on the outside of the curve rises, as illustrated in FIG. 2.

Pneumatic springs 14 are attached to the distal ends of the respective support arms and translate laterally therewith. Four vertical struts 20, attached at their lower ends to the tops of the springs, are connected to the respective cars, two to each car, near their roof line to provide the desired pendulum support. The various interconnections are, of course, made in resilient bushings to allow the requisite limited universal movement at the various attachment points.

Support in shear is provided for each of the pneumatic springs through upper and lower lateral link structures 24 and 26, respectively, each of the lateral link structures being suitably connected to the upper and lower spring support plates, 25 and 27, at one end and to the car structure at the other end. The respective structures when so attached form equilateral wishbones and maintain the upper and lower ends of the spring on a common vertical axis as the gap between the cars opens and closes. At the same time, since the various connections between the individual links and the other structures are made resilient, they permit unhindered the vertical movement of the springs as the springs cushion the vehicle in their normal operating mode.

It will be seen, therefore, that the major suspension system connections to each car include two support struts, four lateral links and two drag links. All normal vertical and transverse loads acting on the vehicle are taken through these members. The longitudinal buffing loads are taken directly from one car to another through a pivotal coupling (not shown) which interconnects the vehicles at an articulation point near the plane of the axle. However, this pivotal coupling is not subjected to any substantial vertical loading component, all vertical loads being taken directly to the axle as hereinbefore described.

Fore and aft transoms, 30 and 32, connect the respective trunnions on transversely-opposite sides of the suspension system, the transom-trunnion connections being made to prevent rotation of the trunnions about a longitudinal axis as the support arms translate laterally and a twisting force is produced thereat. The requisite connections are preferably made as shown through the use of four bolts which penetrate the transoms and engage in cooperating holes provided in the end of each trunnion. Since the major forces acting on the transoms are simply those which induce a bending moment in a vertical plane, they may be of relatively lightweight construction, preferably in the general form of an I beam with a vertically oriented web section of substantial depth. The bending moment associated with the windup of the torsilastic mountings is, accordingly, transferred from the axle to the transoms and the twisting force on the axle bearings through the journal box is relieved.

The suspension system herein described incorporates a considerable degree of freedom of movement between components in a lateral direction. While such freedom of movement is essential to the proper functioning of the system, it is nevertheless necessary to limit this movement to a predetermined maximum in each direction. For this purpose, cables 40, or other functionally similar flexible members, are connected between the journal boxes or other elements of the axle support structure and the respective car bodies in resilient mountings at each side thereof. In the resilient mounting to the cars I prefer to interpose a rubber bumper 41 of paraboloid shape between the mounting bracket and the upper end of the flexible member. The cables are provided with sufficient slack, which is taken up by lightweight springs 42, to permit the free translation of the support arms between the previously established limits, except as biased by the torsilastic mountings. Although no arresting function is performed by the cables with the vehicle at rest, they will, however, establish outer positions beyond which the car cannot move.

Preferably, each flexible member will be so oriented and connected that an extrapolation of its longitudinal axis at full extension 46 passes through the longitudinal centerline 48 of the car at a height approximating that of the center of gravity to prevent the impartation of a rolling moment to the car as the cable arrests its transverse movement as hereinbefore described.

It is also advisable to provide arresting means in the system for tying the axle to the vehicle structure to prevent its separation from the vehicle in the event of a derailment. This arresting means should, of course, furnish no interference with the otherwise normal operation of the suspension. It is convenient moreover to utilize the existing cables 40 to perform this additional function. Accordingly, the cables 40 will preferably be so oriented that they will perform the combined function of limiting the vehicle-axle separation in both the lateral and vertical directions.

While I have described my improved suspension system in connection with a particular illustration, I intend no limitation thereby except as set forth in the appended claims.

I claim:

1. In combination, in a suspension system for articulated railway trains wherein the abutting ends of two adjacent cars are resiliently supported on a single axle which is journalled near its ends and positioned therebetween, a spring support arm extending upwardly from and pivotally connected to each of the respective axle journal boxes at torsilastic mountings, the support arms pivoting in a plane perpendicular to the longitudinal axis of the train, spring means attached to the distal end of each arm for resiliently supporting the cars, a transom connected to the respective journal boxes and extending therebetween, the connection between the transom and each journal box being made to prevent rotation of the journal boxes as the support arms pivot thereabout in the torsilastic mountings, and means for limiting the downward vertical movement of the axle with respect to the car bodies to prevent disconnection of the suspension system in the event of a derailment.

2. The combination of claim 1 in which the means for limiting the downward vertical movement of the axle includes a flexible member at each side of the system interconnecting the respective journal box and the car structure with sufficient slack to permit the vertical and transverse translation of the suspension system in its normal operating mode, the flexible members at full extension limiting the relative transverse and vertical translations to respective predetermined maximums.

3. The combination of claim 2 in which each flexible member is so oriented that an extrapolation of its longitudinal axis at full extension passes through the longitudinal centerline of the car at a height approximating that of the center of gravity to prevent the impartation of a rolling moment thereto as the flexible member arrests the transverse movement of the car.

4. In combination, in a suspension system for articulated railway trains wherein the abutting ends of two adjacent cars are resiliently supported on a single axle which is journalled near its ends and positioned therebetween, a spring support arm extending upwardly from and pivotally connected at torsilastic mountings to longitudinally oriented trunnions carried by each of the axle journal boxes, spring means attached to the distal end of each arm for resiliently supporting the cars, fore and aft transoms connecting the trunnions on transversely opposite sides of the system, the connection between the transoms and the respective trunnions being made to prevent rotation of the trunnions about a longitudinal axis as the support arms pivot thereon in the torsilastic mountings, and a flexible member at each side of the system interconnecting the axle structure and the adjacent car with sufficient slack to permit the vertical and transverse movement of the suspension system in its normal operating mode, the flexible members at full extension limiting the relative vertical and transverse movements of the suspension system to respective predetermined maximums.

5. A combination of claim 4 in which each flexible member is so oriented that an extrapolation of its longitudinal axis at full extension passes through the longitudinal centerline of the car at a height approximating that of the center of gravity to prevent the impartation of a rolling moment thereto as the flexible member arrests the transverse movement of the car.

References Cited

UNITED STATES PATENTS

| | | | |
|---|---|---|---|
| 296,904 | 4/1884 | Zachariasen | 105—165 |
| 731,626 | 6/1903 | Sheffield et al. | 105—192 |
| 1,348,991 | 8/1920 | Gilpin | 105—165 |
| 2,935,031 | 5/1960 | Cripe | 105—4 |
| 2,954,746 | 10/1960 | Cripe | 105—168 |

ARTHUR L. LA POINT, *Primary Examiner.*

HOWARD BELTRAN, *Assistant Examiner.*

U.S. Cl. X.R.

105—165, 190, 197, 199, 453